United States Patent [19]

Ozawa

[11] Patent Number: 4,854,683
[45] Date of Patent: Aug. 8, 1989

[54] ZOOM LENS
[75] Inventor: Toshiro Ozawa, Kawasaki, Japan
[73] Assignee: Ricoh Company, Ltd., Tokyo, Japan
[21] Appl. No.: 15,389
[22] Filed: Feb. 17, 1987
[30] Foreign Application Priority Data
Feb. 14, 1986 [JP] Japan .................................. 61-28890
[51] Int. Cl.$^4$ .............................................. G02B 15/14
[52] U.S. Cl. .................................... 350/427; 350/426
[58] Field of Search ................................ 350/427, 426
[56] References Cited
U.S. PATENT DOCUMENTS
4,478,496 10/1984 Kato ..................................... 350/427
4,647,160 3/1987 Ikemori ............................... 350/426
4,721,371 1/1988 Imai ..................................... 350/427

Primary Examiner—Bruce Y. Arnold
Assistant Examiner—Rebecca D. Gass
Attorney, Agent, or Firm—Oblon, Spivak, McClelland, Maier & Neustadt

[57] ABSTRACT

A zoom lens includes, in order from an object, a first lens unit having positive refracting power, a second lens unit having negative refracting power, and a third lens unit having positive refracting power. The second lens unit has a paraxial lateral magnification greater than 1 at all times. The third lens unit is fixed. The distance between the first and second lens units and the distance between the second and third lens units are relatively varied to vary the focal length of the entire lens system.

6 Claims, 17 Drawing Sheets

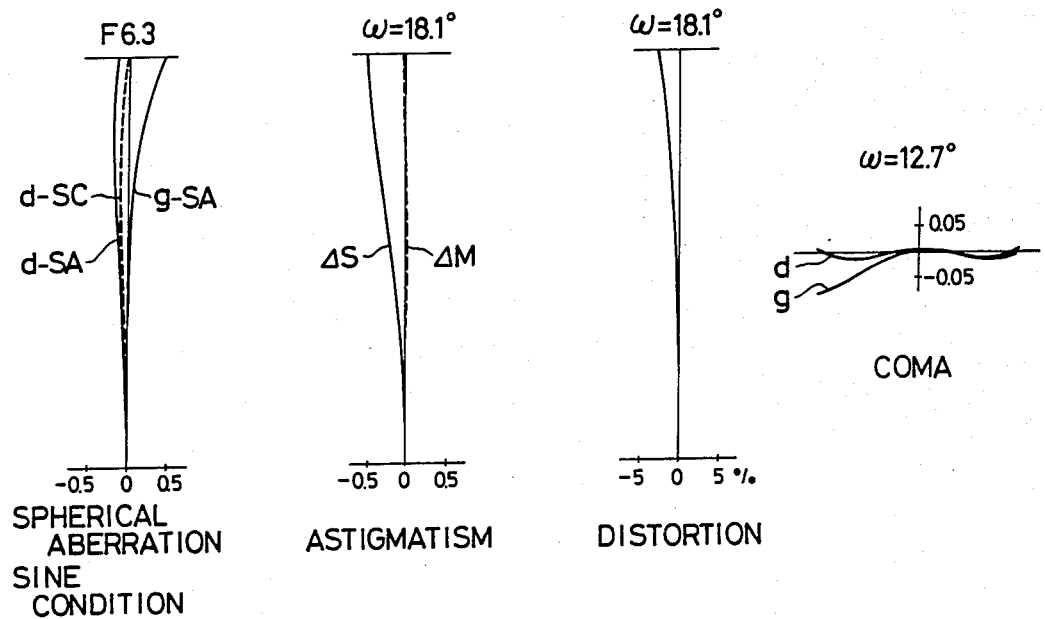

F I G. 9
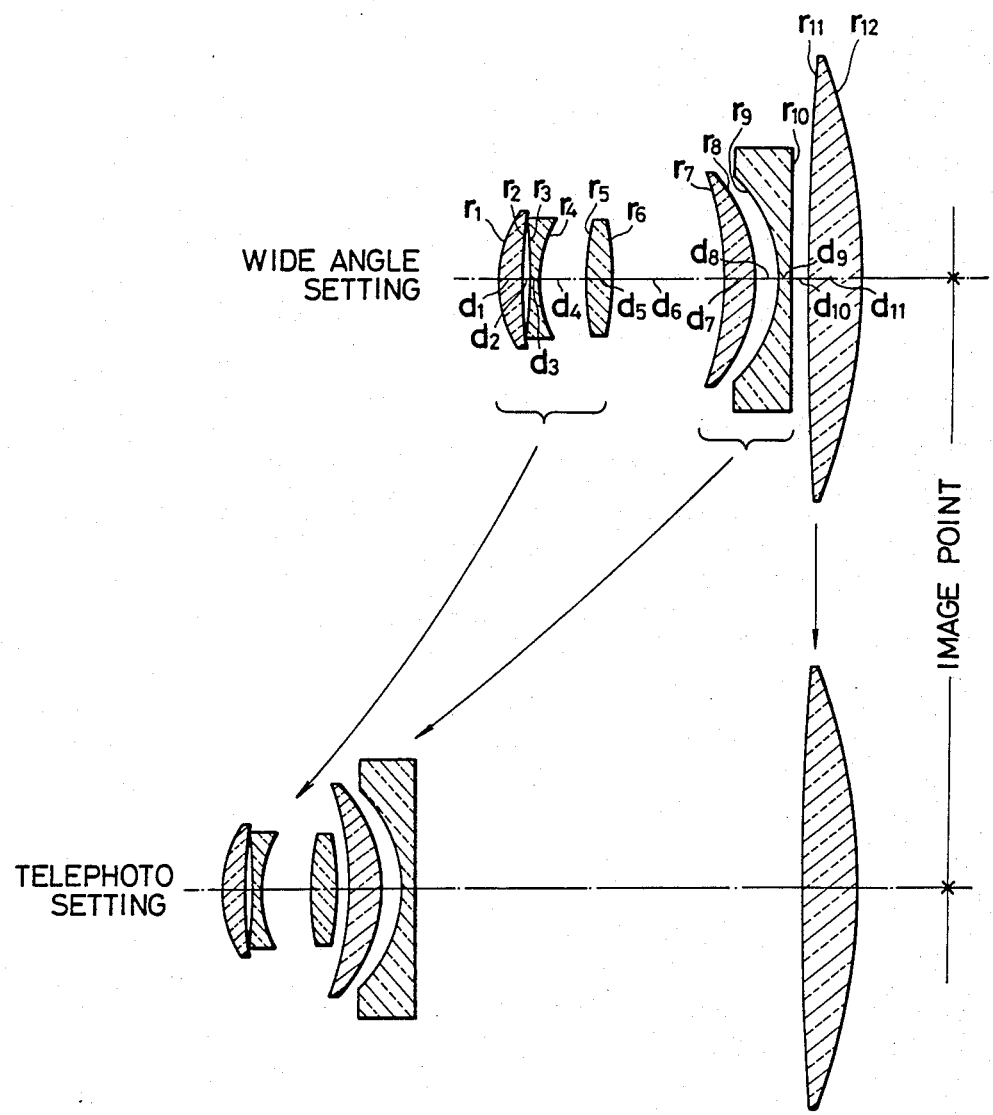

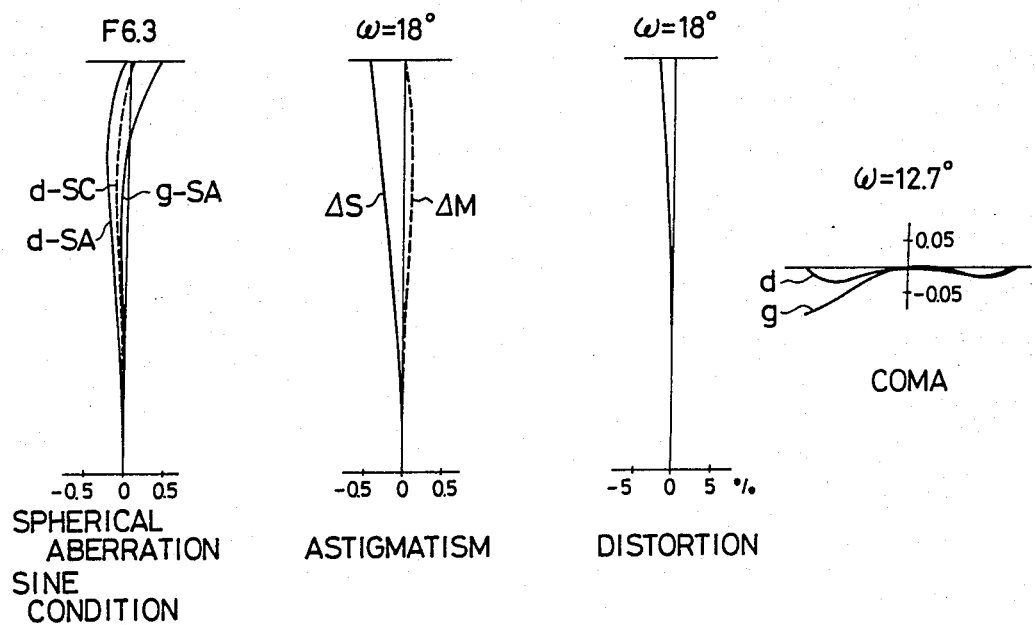
F I G. 10(C)

SPHERICAL ABERRATION SINE CONDITION

ASTIGMATISM

DISTORTION

COMA

ZOOM LENS

BACKGROUND OF THE INVENTION

1. Field of the Invention

The present invention relates generally to a zoom lens and more particularly to a zoom lens for a camera.

2. Discussion of the Background

There has been a demand in recent years for a lens shutter camera with a variable angle of view, and to meet such a demand, bifocal cameras which can switch to a telephoto mode have begun to be in use.

Another demand which has arisen is for a zoom lens with its focal length continuously variable. Lens shutter cameras do not require a long back focus as is the case with the zoom lens of a conventional single-lens reflex camera, but need a lens with a short distance from a first lens surface to an image point. Zoom lenses have also heretofore been used on video cameras or the like. However, zoom lenses of smaller size are desired for such use.

Zoom lenses which have been proposed to meet the above demands are disclosed in Japanese Laid-Open Patent Publication Nos. 57-201213, 60-48009, 60-170816, 60-191216, and 60-191217, for example. These proposed zoom lenses are referred to as two-group zoom lenses.

The two-group zoom lenses includes a first lens group having positive refracting power and a second lens group having negative refracting power. Upon zooming, the distance between the first and second lens groups is varied, and so is the back focus.

The zoom lens of this type fails to achieve good lens performance over an entire zooming range because, upon zooming, the path of a light ray passing through the second lens group is changed greatly resulting in large variations in aberrations of the second lens group such as astigmatism, coma, and chromatic aberration. The distortion of the image tends to be increased while being positive, and is liable to be of the pin-cushion type which the user usually dislikes. The exit pupil is apt to become close to the image plane, so that off-axis light rays fall on the image plane at a large angle. Therefore, if there were irregularities on the film surface, the produced image would be greatly distorted. Since the light is applied to the film surface at the large angle, light reflections from the film surface are increased, causing a reduction in the amount of light at the peripheral edge of the field.

Japanese Laid-Open Patent Publication No. 58-199312 discloses a three-group zoom lens comprising a first lens group having positive refracting power, a second lens group having negative refracting power, and a third lens group having positive refracting power. Upon zooming movement of the lens from a wide-angle setting to a telephoto setting, the distance between the first and second lens groups decreases, whereas the distance between the second and third lens groups increases and so does the back focus.

With the third lens group being movable, the zooming mechanism is complex, and the camera body itself is large in size inasmuch as the zooming mechanism must be disposed outwardly of the third lens group which is of the greatest lens diameter. The refracting power of the second lens group is required to be increased to prevent the distance between the first and second lens groups from being excessively small in the telephoto setting. This however increases the amount of aberration produced by the second lens group, and increased amount of aberration cannot sufficiently be corrected.

SUMMARY OF THE INVENTION

It is an object of the present invention to provide a zoom lens which includes a small-size, simple zooming mechanism for moving three lens groups and which has good lens performance over an entire zooming range.

A zoom lens according to the present invention comprises, in order from an object, a first lens group having a positive refracting power, a second lens group having negative refracting power, and a third lens group having positive refracting power. The second lens group has a paraxial lateral magnification greater than 1 at all times. The third lens group is fixed. The distance between the first and second lens groups and the distance between the second and third lens groups are relatively varied to vary the focal length of the entire lens system.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 7(A) through 7(C) are diagrams showing aberrations of EXAMPLE 3;

FIG. 9 is a cross-sectional view of element lenses of a zoom lens according to EXAMPLE 5;

FIGS. 10(A) through 10(C) are diagrams showing aberrations of EXAMPLE 5;

DESCRIPTION OF THE PREFERRED EMBODIMENT

Figure 1:
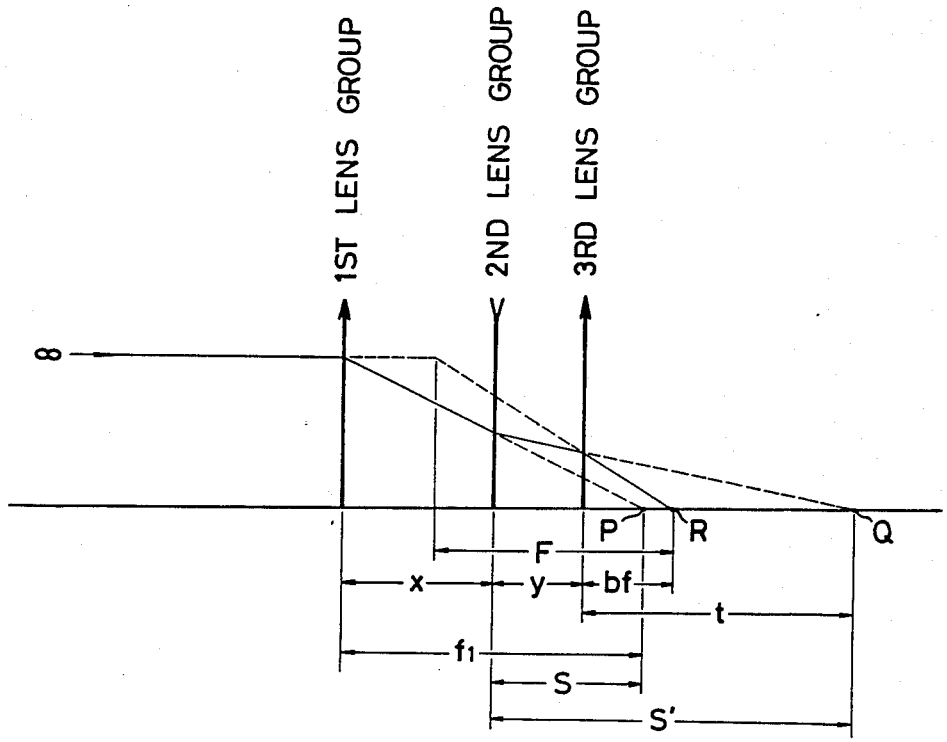
FIG. 1 is a diagram showing a basic lens arrangement of a zoom lens according to the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein FIG. 1 shows a diagram of the basic zoom lens arrangement of the present invention.

A zomm lens according to the present invention comprises, in order from an object, a first lens group having positive refracting power, a second lens group having negative refracting power, and a third lens group having positive refracting power, the second lens group having a paraxial lateral magnification $m_2$ greater than 1 at all times, the third lens grop being fixed, the arrangement being such that the distance between the first and second lens groups and the distance between the second and third lens groups are relatively varied to vary the focal length of the entire lens system.

The zoom lens of the invention meets the following conditions:

$$0.65 < f_1/F_W < 0.9 \tag{$\alpha$}$$

$$1.0 < |f_2|/f_1 < 1.5 \tag{$\beta$}$$

$$0.85 < m_3 < 0.95 \tag{$\gamma$}$$

where $F_W$ is the focal length of the overall lens system at the wide-angle end, $f_1$, $f_2$ are the focal lengths of the first and second lens groups, respectively, and $m_3$ is the paraxial lateral magnification of the third lens group. Furthermore, if the first lens group is divided at the largest gap therein into a front group closer to the object and a rear group closer to the image, the front group includes at least one negative lens, and the rear group includes at least one positive lens.

Where the front group of the first lens group is composed of a positive lens and a negative lens, the Abbe number $\nu_+$ of the positive lens and the Abbe number $\nu_-$ of the negative lens should preferably be selected to meet the relationship:

$$|\nu_+ - \nu_-| < 10 \tag{$\delta$}$$

Where the second lens group comprises, in order from an object, a positive lens and a negative lens, it is preferable to position the positive lens with its surface of a larger curvature being closer to the image and convex toward the image.

A conventional zoom lens for use in a single-lens reflex camera comprises a positive lens group, a negative lens group, and a positive lens group. When a ray of light falls on the lens system parallel to the optical axis, the light ray after leaving the second lens group is applied to the third lens group at a position higher than the position where the light ray has left the second lens group. This zoom lens is a so-called retrofocus system with a long back focus, which is suitable for use as a zoom lens for a single-lens reflex camera.

However, the above conventional lens system is disadvantageous in that it fails to provide a small-size system for alens which does not require a long back focus such as a lens for a lens shutter camera.

According to the present invention, as shown in FIG. 1, a ray of light parallel to the optical axis is applied to the lens system, and, after leaving the second lens group, is applied to the third lens group at a position lower than the position where the light ray has left the second lens group. With such an arrangement, the back focus is shortened, and the ratio of the distance between the first lens surface to the image point to the focal length, i.e., the telephoto ratio, is small. It is now assumed as shown in FIG. 1 that the point where a ray of light parallel to the optical axis, having been applied to the lens system, is focused by the first lens group is indicated by P, the point where the light directed toward the point P is magnified and focused by the second lens group is indicated by Q, and the point where the light directed toward the point Q is magnified and focused by the third lens group is indicated by R. The distance bf from the third lens group to the point R is referred to as a back focus of the entire lens system. The paraxial lateral magnification $m_2$ obtained by the second lens group is given by:

$$m_2 = S'/S \tag{1}$$

where S is the distance from the second lens group to the point P and S' is the distance from the second lens group to the point Q. Where the $m_2$ is selected to be larger than 1, a light ray having left the second lens group is applied to the third lens group at a position lower than the position where the light has left the second lens group. Therefore, the zoom lens system can be of a compact construction.

Assuming that the focal length of the overall lens system is F, the focal length of the ith lens group is $f_i$, and the distance from the third lens group to the point Q is t, then the paraxial lateral magnification $m_3$ by the third lens group is expressed by:

$$m_3 = \frac{bf}{t} = 1 - \frac{bf}{f_3} \tag{2}$$

As is apparent from FIG. 1, $m_3$ is in the range of $0 < m_3 < 1$.

The focal length F of the overall lens system is given by:

$$F = f_1 \cdot m_2 \cdot m_3 \tag{3}$$

The distance x between the first and second lens groups and the distance y between the second and third lens groups are given by:

$$x = f_1 - f_2 \left(\frac{1}{m_2} - 1\right) \tag{4}$$

$$y = f_2(1 - m_2) - f_3 \left(\frac{1}{m_3} - 1\right) \tag{5}$$

The focal length F and the paraxial lateral magnifications $m_2$, $m_3$ at the wide-angle and telephoto ends are indicated with suffixes w, t, respectively. A zoom lens having a constant zooming ratio k expressed by:

$$k = \frac{F_t}{F_w} = \frac{m_{2t} \cdot m_{3t}}{m_{2w} \cdot m_{3w}} \tag{6}$$

can be obtained in which the focal length of the entire lens system is varied k times by continuously changing $(m_2, m_3)$ from $(m_{2w}, m_{3w})$ to $(m_{2t}, m_{3t})$, according to the equation (3).

As disclosed in Japanese Laid-Open Patent Publication No. 58-199312, by moving the third lens group toward the object upon zooming movement from the wide-angle setting to the telephoto setting, $m_{3t}$ becomes smaller than $m_{3w}$ according to the equation (2). Therefore, to obtain a zoom lens having a constant zooming ration, $m_{2t}$ has to be increased to make up for a reduction of $m_{3t}$ according to the equation (6). Thus, in view of the equation:

$$x_t = f_1 + |f_2| \left(\frac{1}{m_{2t}} - 1\right)$$

$x_t$ is excessively reduced, making it difficult to construct a zoom lens system of thick lenses. If the negative refracting power of the second lens group were increased to prevent this, aberrations generated by the second lens group would be increased, failing to accomplish good lens performance especially in the wide-angle setting.

The third lens group is of the greatest lens diameter because it is closest to the image plane. If a zooming mechanism for moving the third lens group were disposed outwardly of the third lens group, then the zooming mechanism would be complicated and the camera itself would be increased in size. To keep the camera small in size, it is preferable to fix the third lens group. With the third lens group fixed in position, the back focus bf is constant and the magnification $m_3$ remains constant according to the equation (2).

As a result, in order for the lens system of the present invention to function as a zoom lens, zooming should be effected by varying $m_2$ in the equation (3). At this time, the distance x between the first and second lens groups and the distance y between the second and third lens groups are varied according to the equations (4) and (5), respectively, for zooming movement.

Assuming that various aberrations such as spherical aberration, astigmatism, coma, and chromatic aberration produced by the ith lens group are indicated by Si, the aberration S of the entire lens system is expressed by:

$$S \approx m_2 \cdot m_3 S_1 + m_3 S_2 + S_3 \quad (7)$$

The aberration $S_2$ generated by the second lens group having strong refracting power for variable magnification is widely varied by the zooming movement. Since $0 < m_3 < 1$, however, the term of $S_2$ in the equation (7) has a reduced effect on the overall amount of aberration S. Consequently, it is possible to reduce variations in the amount of aberration which are caused by zooming movement, and to correct the aberration of the entire lens system over the zooming range. These are advantages which could not be achieved by a two-group zoom lens.

Figure 2:
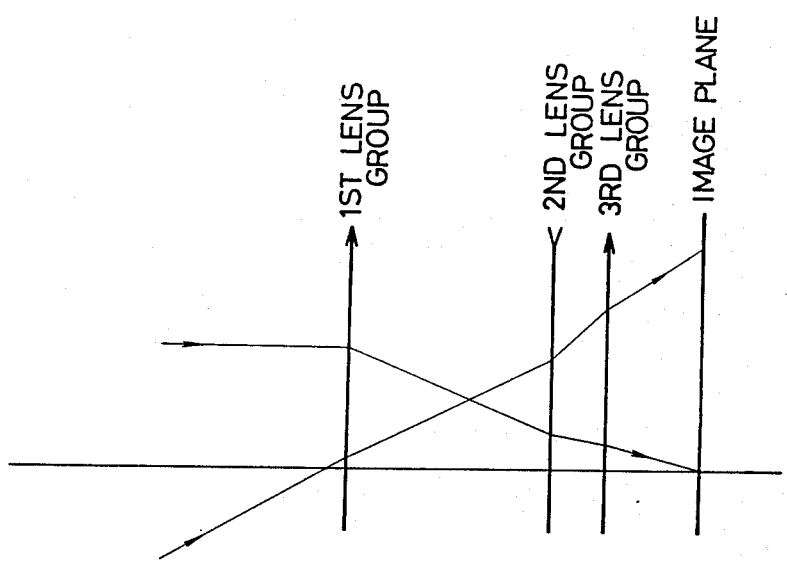
FIG. 2 is a diagram showing an optical path of the zoom lens.
Figure 3:
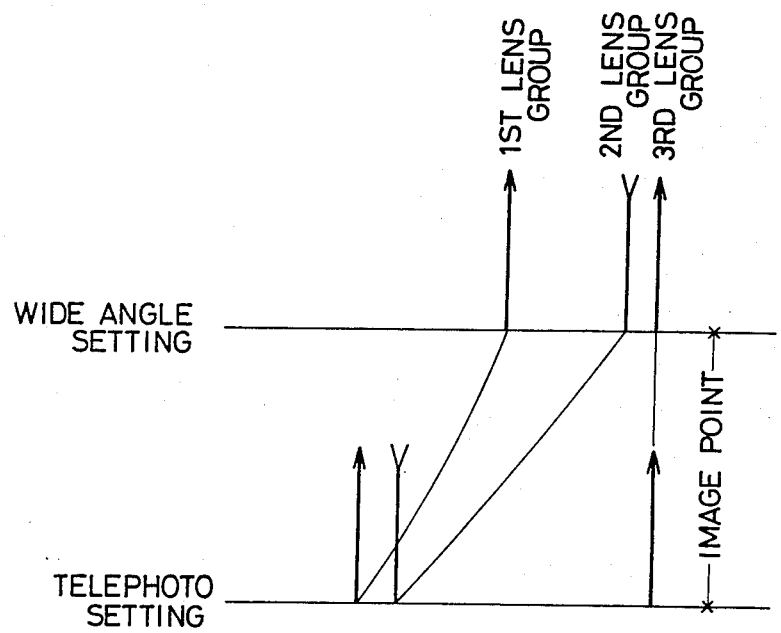
FIG. 3 is a diagram showing paths of movement of lens groups of the zoom lens.
Figure 4:
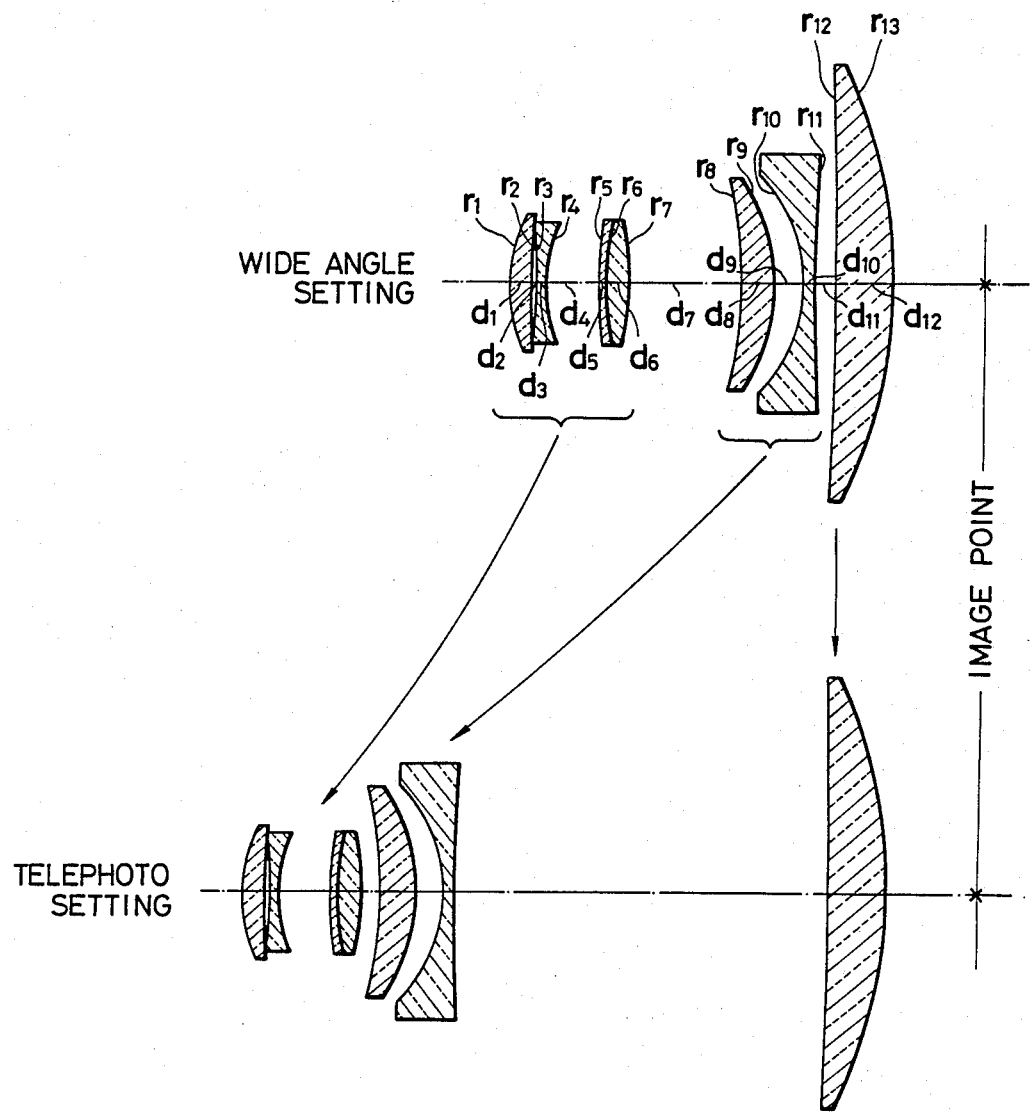
FIG. 4 is a cross-sectional view of element lenses of zoom lenses according to EXAMPLES 1 through 4.
Figure 5A:
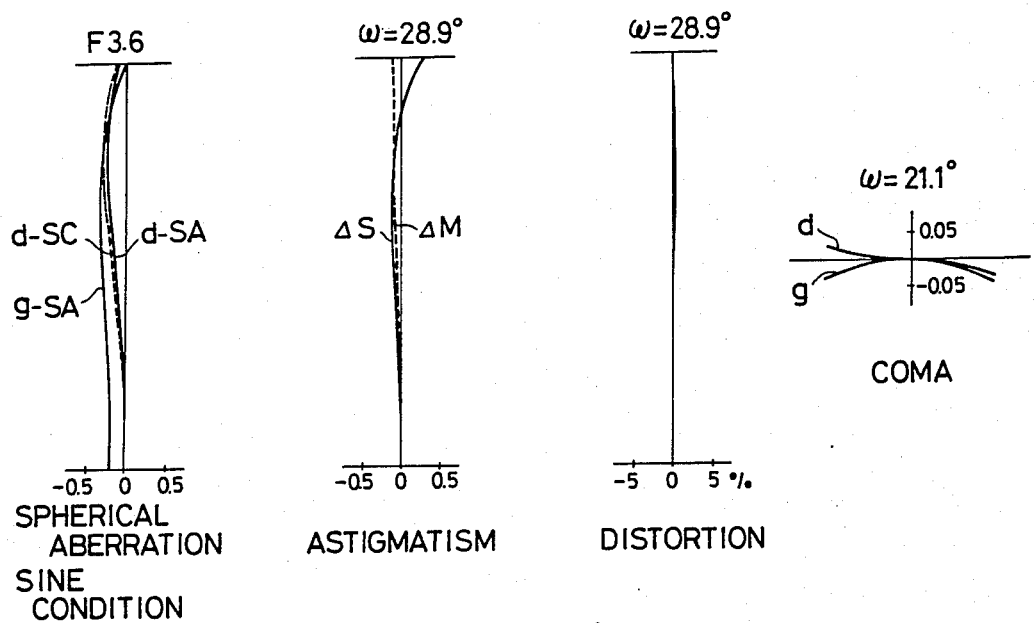
FIGS. 5(A) through 5(C) are diagrams showing aberrations of EXAMPLE 1.
Figure 5B:
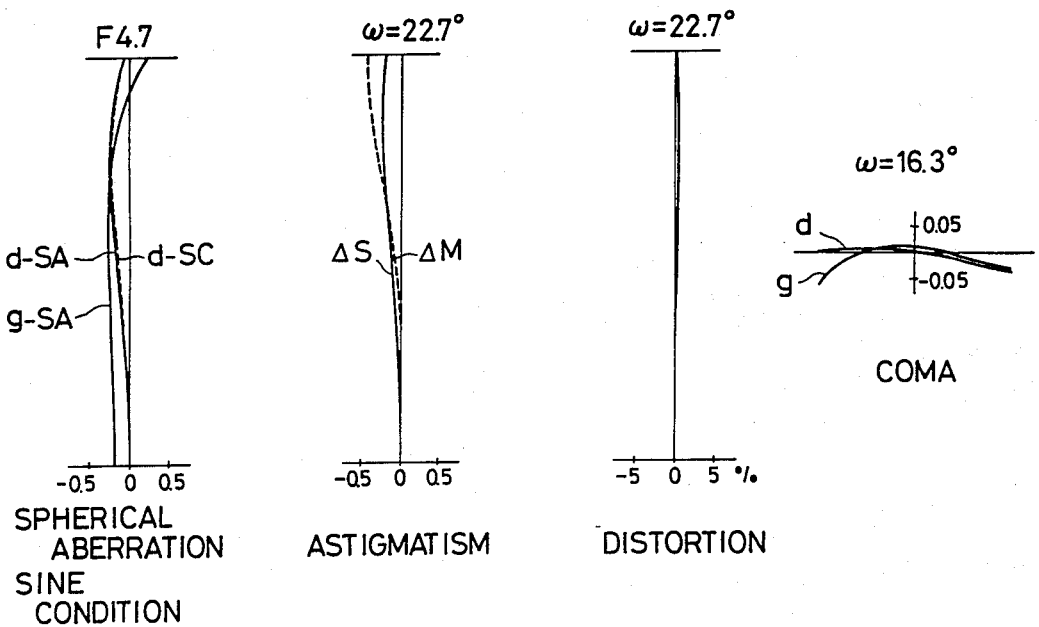
Figure 5C:
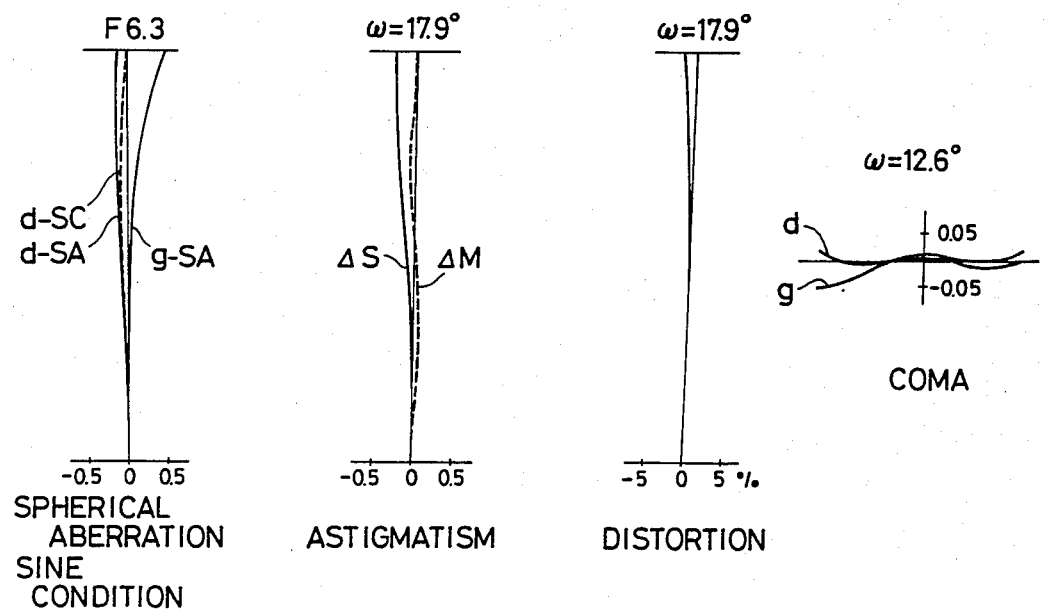
Figure 6A:
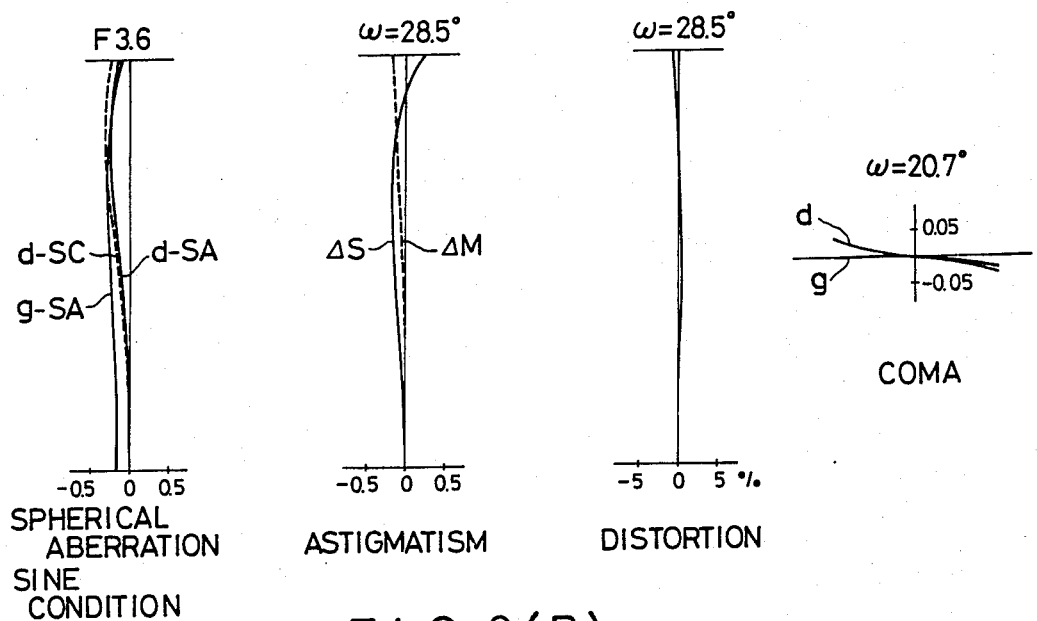
FIGS. 6(A) through 6(C) are diagrams showing aberrations of EXAMPLE 2.
Figure 6B:
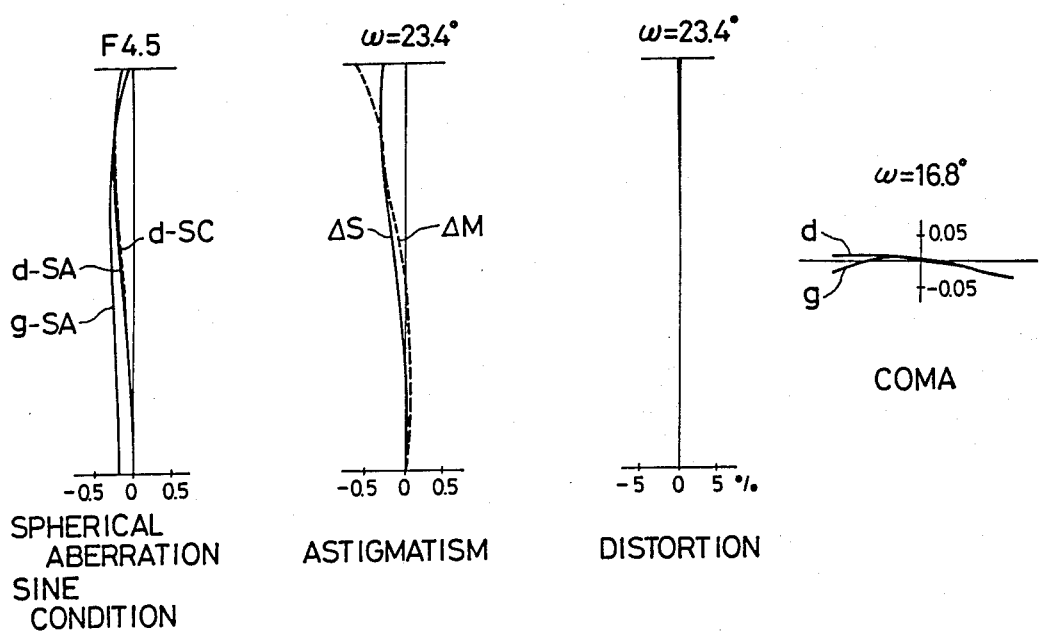
Figure 6C:
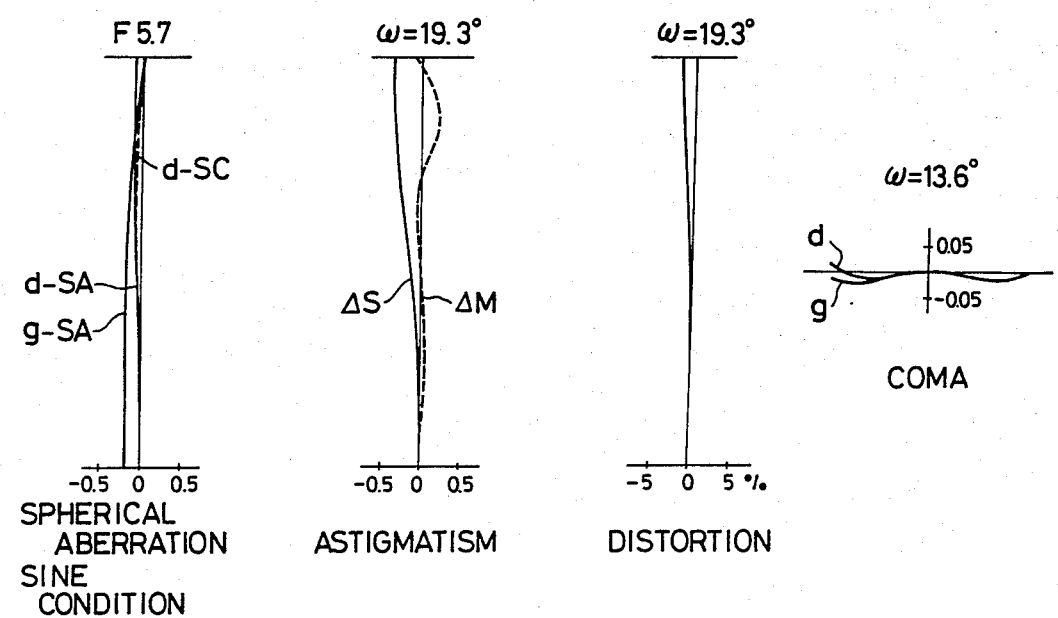
Figure 7A:
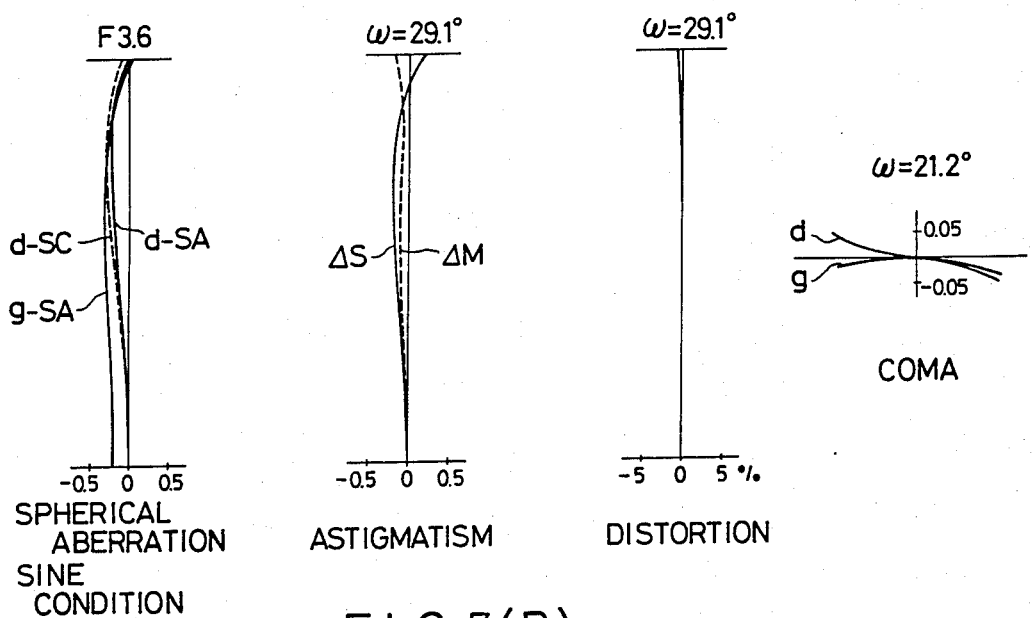
Figure 7B:
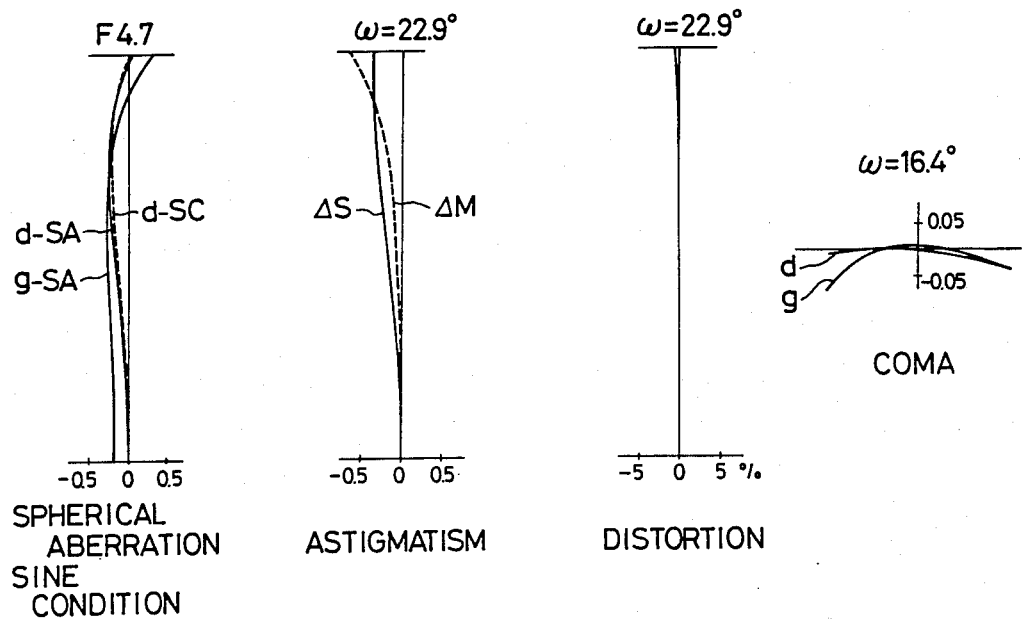
Figure 8A:
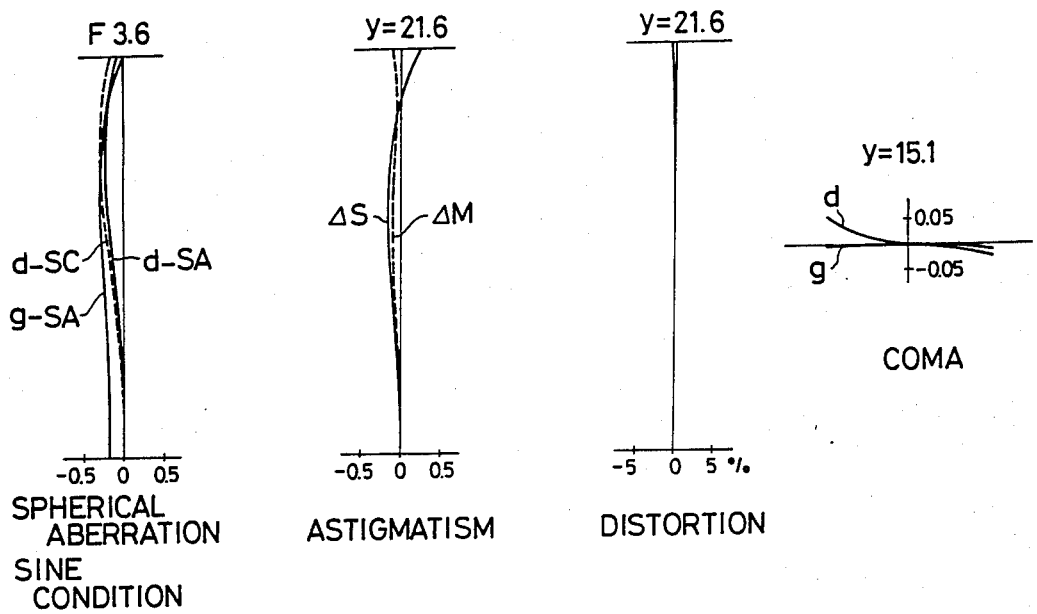
FIGS. 8(A) through 8(C) are diagrams showing aberrations of EXAMPLE 4.
Figure 8B:
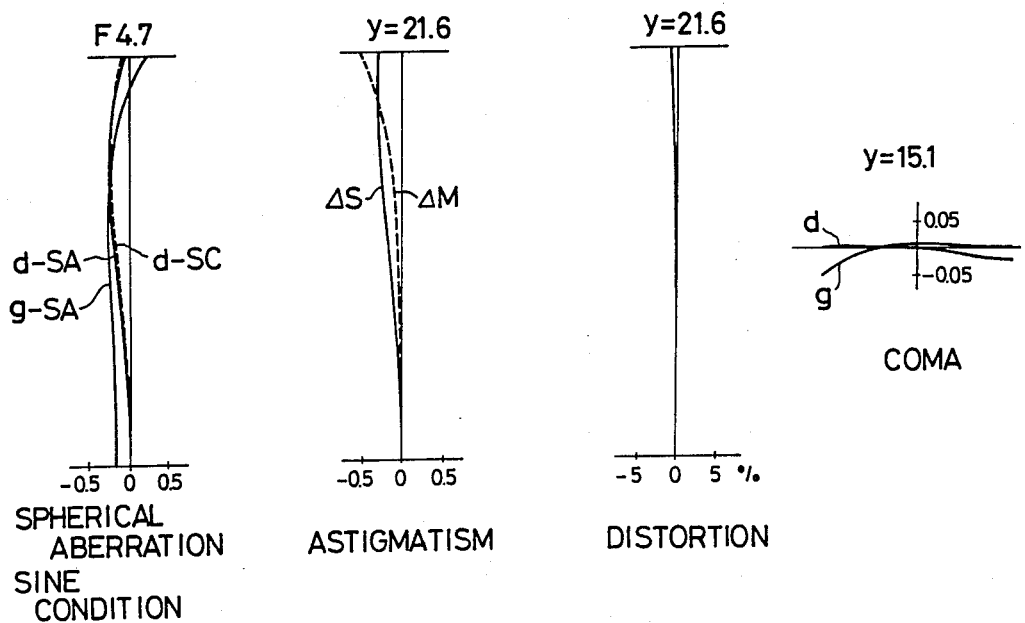
Figure 8C:
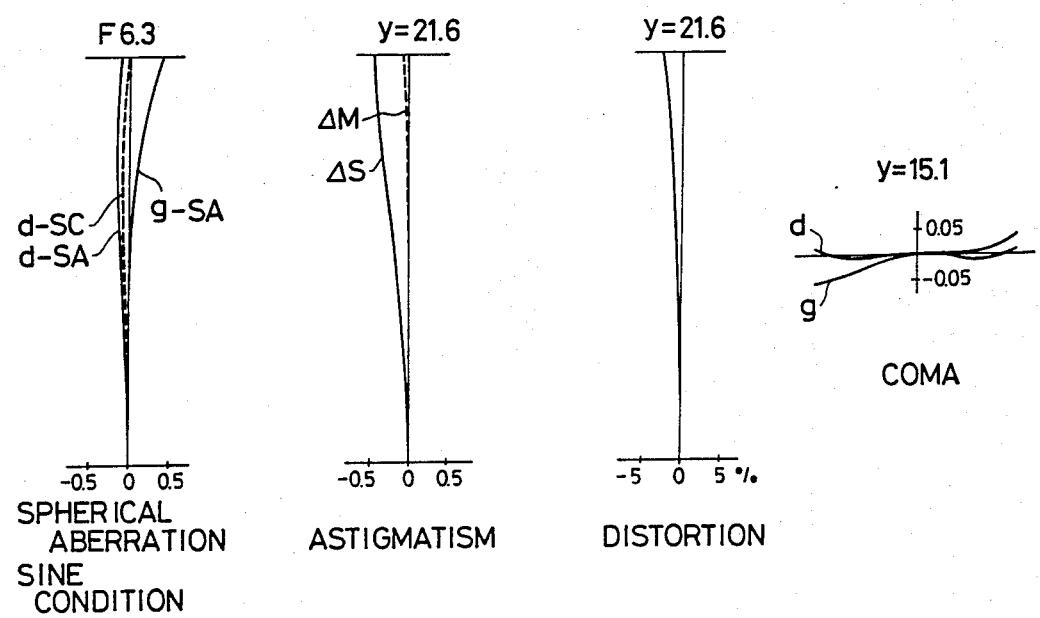
Figure 10A:
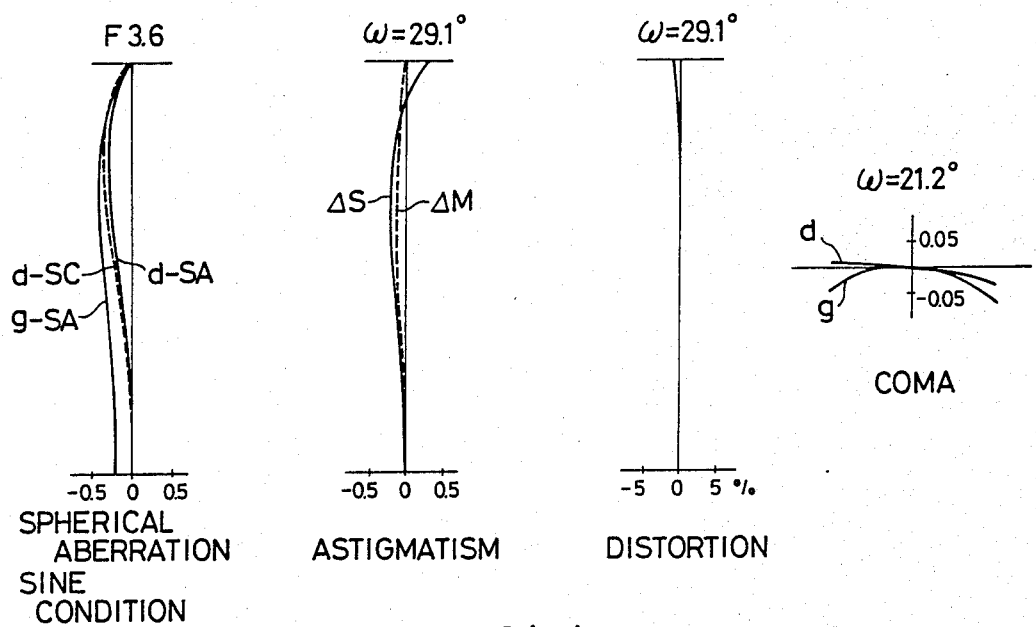
Figure 10B:
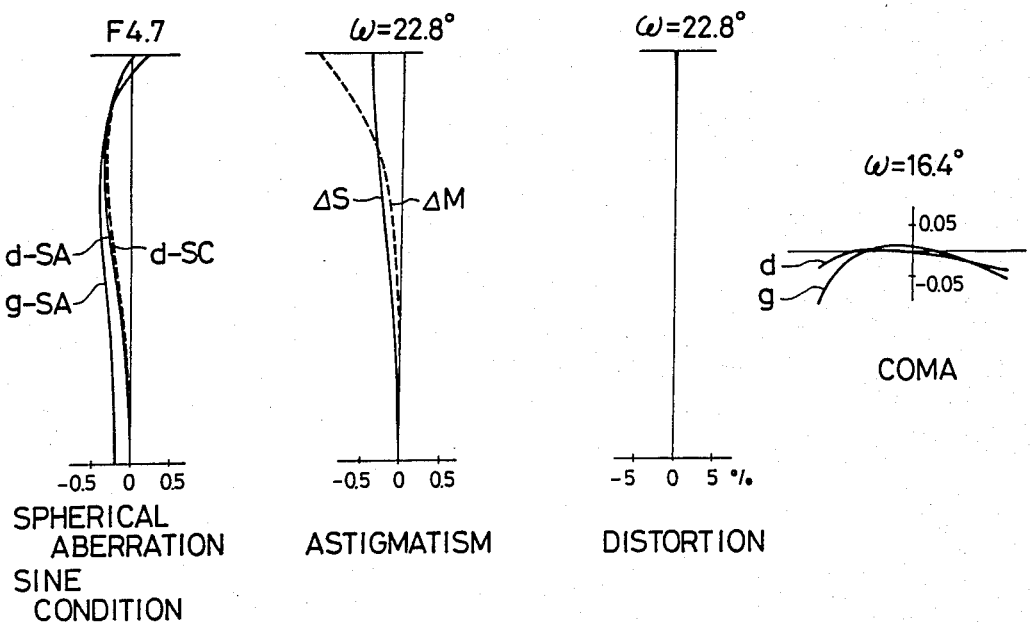
Figure 11:
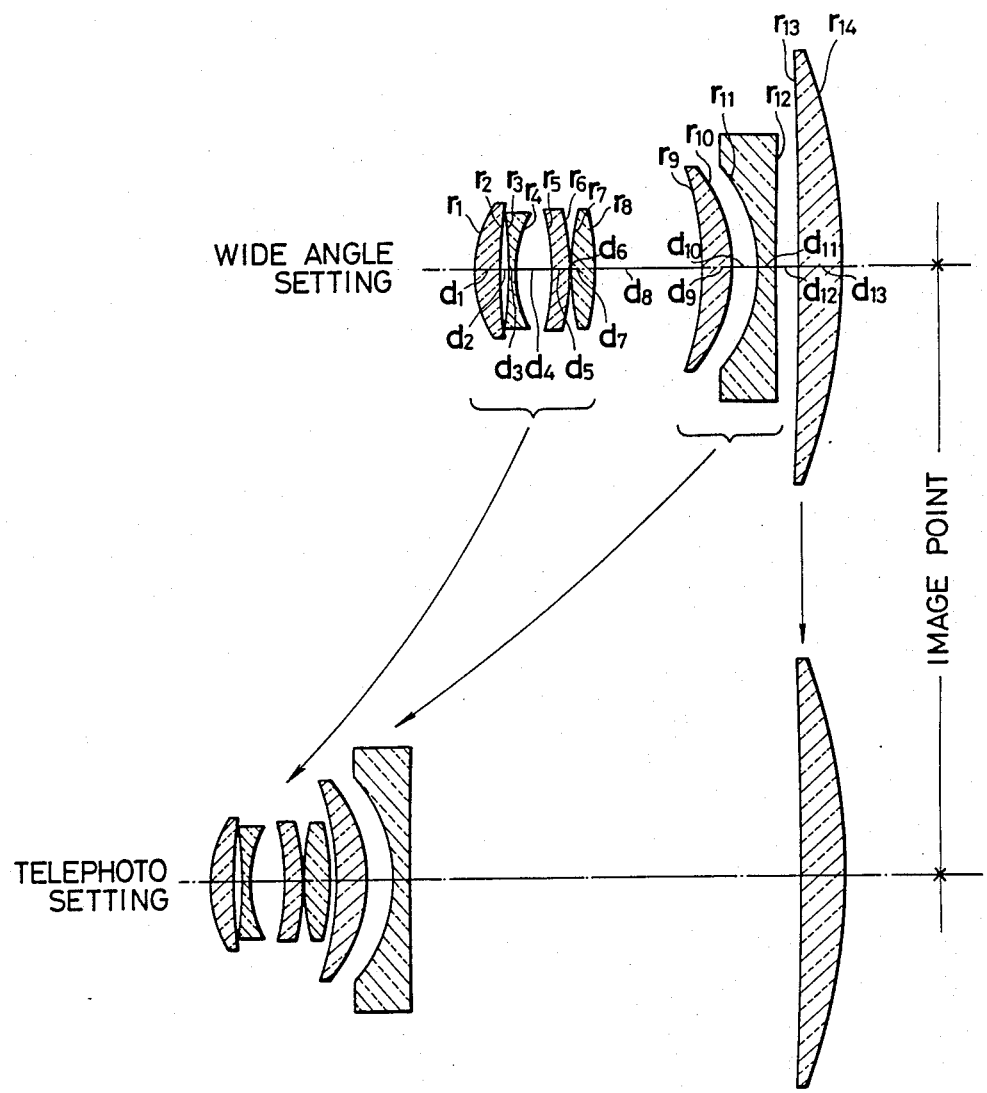
FIG. 11 is a cross-sectional view of element lenses of a zoom lens according to EXAMPLE 6.
Figure 12A:
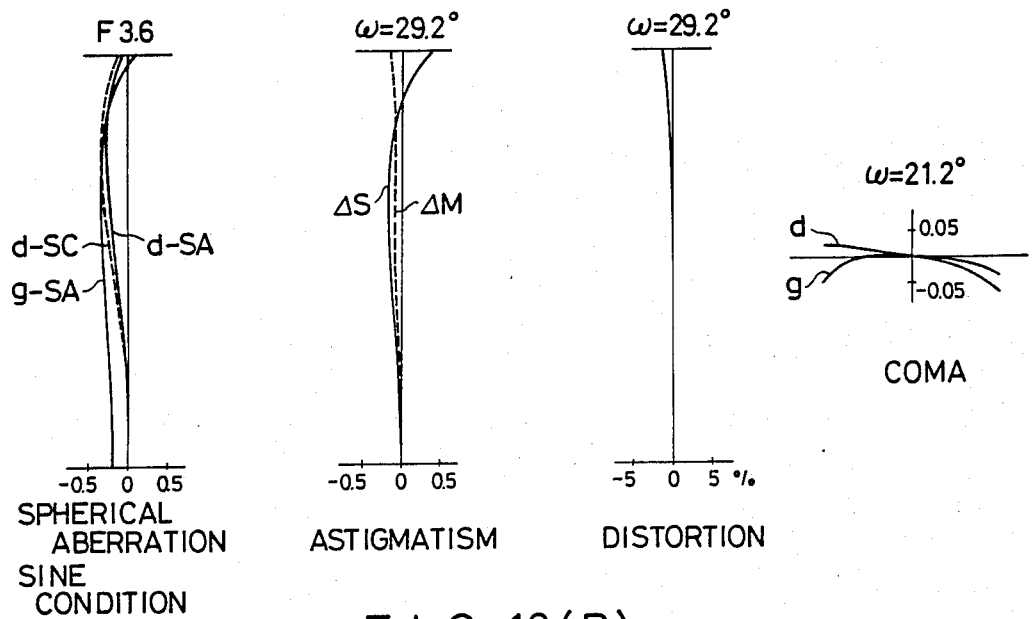
FIGS. 12(A) through 12(C) are diagrams showing aberrations of EXAMPLE 6.
Figure 12B:
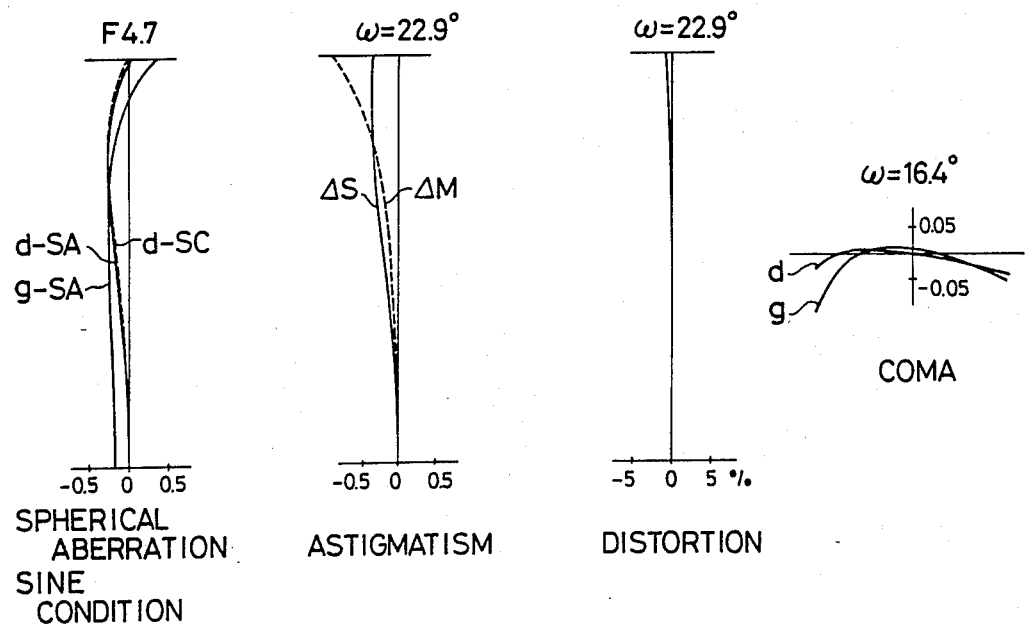
Figure 12C:
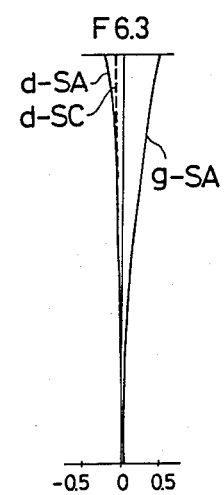
Figure 12C:
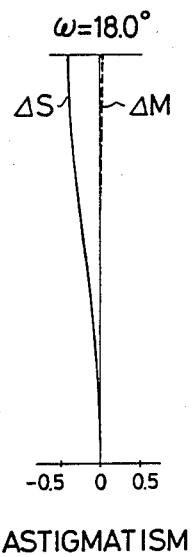
Figure 12C:
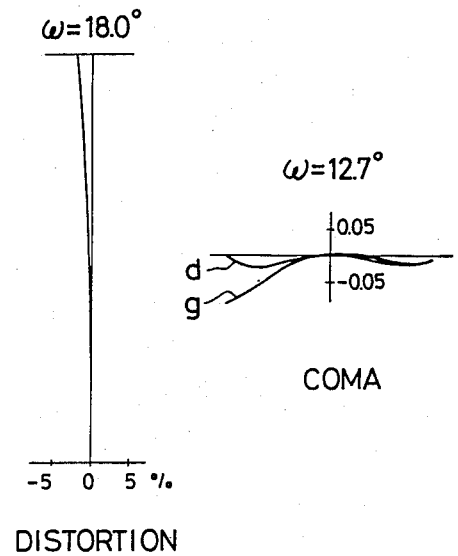

The aberration $S_3$ generated by the third lens group is also varied since the path of light rays varies due to the zooming movement. However, inasmuch as the refracting power of the third lens group is smaller than those of the first and second lens groups, the amount of aberration itself produced by the third lens group is small. As shown in FIG. 2, an off-axis light ray is bent by the third lens group such that its angle of incidence on the image plane will be smaller, resulting in a greater tendency to give rise to negative distortion, facilitate correction of distortion of the entire lens system, and get the exit pupil far from the image plane. Therefore, image distortion or a reduction in the amount of light at the peripheral edge of the field can be prevented. FIG. 3 shows the paths of movement of the respective lens groups of the zoom lens thus constructed.

The condition ($\alpha$) given above serves to keep a space for the second lens group to move therein in the case where a lens system having an angle of view and a zooming ratio of the embodiment of the invention is constructed of thick lenses. If the lower limit were exceeded, then it would be difficult to keep the first and second lens groups spaced apart from each other at the telephoto end. Conversely, if the upper limit were exceeded, then $m_2$ would have to reduced according to the equation (3), and the distance between the second and third lens groups would become smaller according to the equation (5), making it difficult to achieve a zoom lens in the wide-angle setting.

The condition ($\beta$) serves to maintain the aberrations well in balance over the entire zooming range under the condition ($\alpha$). The aberrations generated by the first and second lens groups are of opposite signs and compensate for each other. Therefore, if $|f_2|$ were increased in excess of the upper limit of the condition ($\beta$), then the lens performance would be lowered in the telephoto setting, especially failing to correct the curvature of field. If the lower limit were exceeded, then the lens performance would be lowered in the wide-angle setting, especially tending to correct the curvature of field excessively.

As is apparent from equation (7), variations in the aberrations are smaller as $m_3$ is smaller. In a zoom lens having an angle of view and a zooming ratio of the embodiment of the invention, such an effect would be lost and particularly chromatic aberration or magnification would vary to a large extent if $m_3$ would exceed the upper limit of the condition ($\gamma$). If $m_3$ were reduced in excess of the lower limit of the condition ($\gamma$), then the aberrations generated by the third lens group would be increased, with the result that astigmatism would be increased and distortion would be too large negatively in the telephoto setting.

In order to reduce various aberrations such as spherical aberration, astismatism, coma, and chromatic aberration generated by the first lens group, the first lens group should include at least one negative lens. Moreover, in order that the first lens group may have positive refracting power, it needs to include at least one positive lens. By positioning such a negative lens in the front group of the first lens group, positioning such a positive lens in the rear group thereof, and keeping the front and rear lens groups widely apart from each other, it becomes easy to move the principal point of the first lens group toward the image, to provide a sufficient distance between the first and second lens groups in the telephoto setting, and to construct a zoom lens of thick lenses.

The condition ($\delta$) is effective in simultaneous correction of on-axis chromatic aberration and chromatic aberration on magnification. Meeting this condition appropriately corrects on-axis chromatic aberration while preventing chromatic aberration on magnification from being excessively low in the wide-angle setting.

As described aboe, in case the second lens group is compressed of, in order from the object, a positive lens and a negative lens, the positive lens having a surface of strong curvature which faces the image and is convex toward the image, it is possible to correct the astigmatism in the wide-angle setting and correct spherical aberration in the telephoto setting.

Examples of the present invention will be described below.

In Examples given below, r indicates a paraxial radius of curvature, d a lens surface-to-surface distance, n a refractive index with respect to d line, and $\nu_d$ an Abbe number. $K_i$, $A_i$, $B_i$, $C_i$, $D_i$ are a conical coefficient and aspherical coefficients in the case where the aspherical surface at the ith surface is expressed by the following equation:

$$Z = \frac{\frac{1}{ri}y^2}{1+\sqrt{1-(1+Ki)\frac{1}{ri^2}y^2}} + Ay^4 + By^6 + Cy^8 + Dy^{10}$$

where y is the height from the optical axis, and Z is the distance from the vertex of the lens toward the direction of the optical axis.

Example 4 represents a finite design in which best lens performance is achieved at a magnification of about 1/40.

The lens material of the third lens group which has a refractive index of 1.491 is acrylic resin.

EXAMPLE 1

| F = 39.1–67.9 | $F_{NO.}$ = 3.6–6.3 | 2ω = 57.8°–35.9° | | |
|---|---|---|---|---|
| Surface No. | r | d | n | νd |
| 1 | 13.912 | 2.25 | 1.85030 | 32.2 |
| 2 | 61.322 | 0.49 | | |
| 3 | −52.203 | 0.8 | 1.68893 | 31.2 |
| 4 | 12.892 | 5.33 | | |
| 5 | 38.345 | 0.75 | 1.80518 | 25.5 |
| 6 | 20.457 | 2.65 | 1.713 | 53.9 |
| 7 | −22.642 | Variable | | |
| 8 | −41.015 | 3.4 | 1.57501 | 41.5 |
| 9 | −16.623 | 2.67 | | |
| 10 | −14.207 | 1.3 | 1.713 | 53.9 |
| 11 | 203.398 | Variable | | |
| 12 | 2934.35 | 6.2 | 1.491 | 61.4 |
| 13 | −44.834 | | | |

$K_{12}$ = 8716.3432  $A_{12}$ = −5.02205 × 10$^{-6}$  $B_{12}$ = 2.24529 × 10$^{-8}$
$C_{12}$ = −4.92577 × 10$^{-11}$  $D_{12}$ = 4.10291 × 10$^{-14}$

| F | 39.1 | 51.6 | 67.9 |
|---|---|---|---|
| $d_7$ | 11.076 | 5.769 | 1.741 |
| $d_{11}$ | 1.744 | 17.036 | 37.178 |

$\frac{f_1}{F_W} = 0.75$  $\frac{|f_2|}{f_1} = 1.11$  $m_3 = 0.90$

Telephoto ratio 1.22–1.09

EXAMPLE 2

| F = 40–63 | $F_{NO.}$ = 3.6–5.7 | 2ω = 57.0°–38.5° | | |
|---|---|---|---|---|
| Surface No. | r | d | n | νd |
| 1 | 13.564 | 2.3 | 1.834 | 37.3 |
| 2 | 42.333 | 1.3 | | |
| 3 | −69.136 | 0.8 | 1.64769 | 33.8 |
| 4 | 12.178 | 4.86 | | |
| 5 | 28.321 | 0.8 | 1.72825 | 28.3 |
| 6 | 17.515 | 2.7 | 1.62041 | 60.3 |
| 7 | −23.841 | Variable | | |
| 8 | −43.618 | 3.6 | 1.56732 | 42.8 |
| 9 | −16.194 | 2.19 | | |
| 10 | −13.889 | 1.3 | 1.62041 | 60.3 |
| 11 | 285.902 | Variable | | |
| 12 | 3576.68 | 5.4 | 1.491 | 61.4 |
| 13 | −50.263 | | | |

$K_{13}$ = −4.53522  $A_{13}$ = 2.28436 × 10$^{-6}$  $B_{13}$ = −4.82469 × 10$^{-8}$
$C_{13}$ = 1.41316 × 10$^{-10}$  $D_{13}$ = −1.38128 × 10$^{-13}$

| F | 40.0 | 50.2 | 63.0 |
|---|---|---|---|
| $d_7$ | 12.163 | 5.552 | 0.284 |
| $d_{11}$ | 1.282 | 16.317 | 35.185 |

$\frac{f_1}{F_W} = 0.82$  $\frac{|f_2|}{f_1} = 1.34$  $m_3 = 0.91$

Telephoto ratio 1.20–1.11

EXAMPLE 3

| F = 39.1–67.9 | $F_{NO.}$ = 3.6–6.3 | 2ω = 58.1°–36.2° | | |
|---|---|---|---|---|
| Surface No. | r | d | n | νd |
| 1 | 12.462 | 2.4 | 1.8503 | 32.2 |
| 2 | 42.819 | 0.46 | | |
| 3 | −93.455 | 0.8 | 1.68893 | 31.2 |
| 4 | 11.130 | 5.27 | | |
| 5 | 25.614 | 0.75 | 1.80518 | 25.5 |
| 6 | 17.586 | 2.8 | 1.58913 | 61.3 |
| 7 | −21.238 | Variable | | |
| 8 | −35.618 | 3.6 | 1.53172 | 48.8 |
| 9 | −14.709 | 2.38 | | |
| 10 | −12.765 | 1.3 | 1.62041 | 60.3 |
| 11 | 185.129 | Variable | | |
| 12 | −730.371 | 5.1 | 1.72 | 50.3 |
| 13 | −53.028 | | | |

| F | 39.1 | 51.6 | 67.9 |
|---|---|---|---|
| $d_7$ | 11.42 | 5.603 | 1.187 |
| $d_{11}$ | 1.662 | 17.742 | 38.922 |

$\frac{f_1}{F_W} = 0.78$  $\frac{|f_2|}{f_1} = 1.14$  $m_3 = 0.88$

Telephoto ratio 1.22–1.10

EXAMPLE 4

| F = 39.1–67.9 | $F_{NO.}$ = 3.6–6.3 | Image height y = 21.6 | | |
|---|---|---|---|---|
| Surface No. | r | d | n | νd |
| 1 | 13.227 | 2.2 | 1.8061 | 33.3 |
| 2 | 37.667 | 0.65 | | |
| 3 | −61.808 | 0.8 | 1.62004 | 36.3 |
| 4 | 12.451 | 5.36 | | |
| 5 | 30.319 | 0.75 | 1.80518 | 25.5 |
| 6 | 15.406 | 3.0 | 1.6968 | 55.5 |
| 7 | −25.298 | Variable | | |
| 8 | −49.885 | 3.9 | 1.57501 | 41.5 |
| 9 | −16.184 | 2.27 | | |
| 10 | −13.88 | 1.3 | 1.713 | 53.9 |
| 11 | 221.31 | Variable | | |
| 12 | −18601.43 | 4.93 | 1.744 | 44.9 |
| 13 | −57.858 | | | |

| F | 39.1 | 51.6 | 67.9 |
|---|---|---|---|
| $d_7$ | 12.207 | 6.236 | 1.703 |
| $d_{11}$ | 2.318 | 18.525 | 39.871 |

The amount of outward movement at magnification = −1/40

| F | 39.1 | 55.6 | 67.9 |
|---|---|---|---|
| $\Delta d_7$ | 0.614 | 0.466 | 0.354 |

$\frac{f_1}{F_W} = 0.79$  $\frac{|f_2|}{f_1} = 1.15$  $m_3 = 0.88$

Telephoto ratio (∞) 1.25–1.12

EXAMPLE 5

| F = 39.1–67.9 | $F_{NO.}$ = 3.6–6.3 | 2ω = 58.2°–35.9° | | |
|---|---|---|---|---|
| Surface No. | r | d | n | νd |
| 1 | 11.496 | 2.55 | 1.834 | 37.3 |
| 2 | 44.317 | 0.56 | | |
| 3 | −117.741 | 0.8 | 1.6727 | 32.2 |
| 4 | 9.76 | 4.99 | | |
| 5 | 24.192 | 3.0 | 1.497 | 81.6 |
| 6 | −19.455 | Variable | | |
| 7 | −28.671 | 3.1 | 1.717 | 48.0 |
| 8 | −15.013 | 2.28 | | |
| 9 | −12.739 | 1.3 | 1.6968 | 55.5 |
| 10 | −1198.448 | Variable | | |
| 11 | 323.914 | 5.4 | 1.62041 | 60.3 |
| 12 | −57.525 | | | |

| F | 39.1 | 51.6 | 67.9 |
|---|---|---|---|
| $d_6$ | 11.241 | 5.424 | 1.008 |

-continued

| | d₁₀ | 1.690 | 17.770 | 38.949 |
|---|---|---|---|---|

$$\frac{f_1}{F_W} = 0.78 \quad \frac{|f_2|}{f_1} = 1.14 \quad m_3 = 0.88$$

Telephoto ratio 1.17–1.07

EXAMPLE 6

| | F = 39.1–67.9 | $F_{NO.}$ = 3.6–6.3 | 2ω = 58.4°–35.9° | |
|---|---|---|---|---|
| Surface No. | r | d | n | νd |
| 1 | 12.383 | 2.6 | 1.8061 | 33.3 |
| 2 | 63.955 | 0.62 | | |
| 3 | −59.202 | 0.8 | 1.71736 | 29.5 |
| 4 | 11.532 | 3.35 | | |
| 5 | −28.176 | 2.0 | 1.497 | 81.6 |
| 6 | −22.943 | 0.15 | | |
| 7 | 25.971 | 2.65 | 1.497 | 81.6 |
| 8 | −20.95 | Variable | | |
| 9 | −28.283 | 3.1 | 1.53172 | 48.8 |
| 10 | −14.514 | 2.81 | | |
| 11 | −12.657 | 1.45 | 1.62041 | 60.3 |
| 12 | −1442.38 | Variable | | |
| 13 | −738.79 | 4.5 | 1.6968 | 55.5 |
| 14 | −60.904 | | | |

| F | 39.1 | 51.6 | 67.9 |
|---|---|---|---|
| d₈ | 10.904 | 5.091 | 0.678 |
| d₁₂ | 1.949 | 18.038 | 39.23 |

$$\frac{f_1}{F_W} = 0.77 \quad \frac{|f_2|}{f_1} = 1.17 \quad m_3 = 0.90$$

Telephoto ratio 1.19–1.08

As shown in the cross-sectional views and the aberration diagrams of FIGS. 5–12, the zoom lens is of a simple construction and its aberrations are well corrected though it is small in size with the telephoto ratio ranging from 1.2 to 1.1 and the distance from the first lens surface to the image plane being quite short. Since the third lens group having the maximum outside diameter is fixed, the zooming mechanism required is simple, and hence a camera on which the zoom lens is mounted is compact. Where the third lens group is made of a plastic material, the zoom lens may be reduced in cost and weight.

Although a certain preferred embodiment has been shown and described, it should be understood that many changes and modifications may be made therein without departing from the scope of the appended claims.

I claim:

1. A zoom lens comprising, in order from an object, a first lens unit having positive refracting power, a second lens unit having negative refracting power, and a third lens unit having positive refracting power, said second lens unit having a paraxial lateral magnification $m_2$ greater than 1 at all times, said third lens unit being fixed in position, the arrangement being such that the distance X between the principal points of said first lens unit and said second lens unit and the distance Y between the principal points of said second lens unit and said third lens unit vary continuously so as to substantially satisfy the conditions given by:

$$X = f_1 - f_2(1/m_2 - 1)$$

and $$Y = f_2(1 - m_2) - f_3(1/m_3 - 1),$$

where $f_1$ is the focal length of the first lens unit, $f_2$ is the focal length of the second lens unit, $f_3$ is the focal length of the third lens unit, and $m_3$ is the paraxial lateral magnification of the third lens unit and that the paraxial lateral magnification $m_2$ varies continuously, the zoom lens meeting the following conditions:

$$0.65 < f_1/F_W < 0.9$$

$$1.0 < |f_2|/f_1 < 1.5$$

where $F_W$ is the focal length of the overall zoom lens at the wide-angle end, $f_1$, $f_2$ are the focal lengths of said first lens unit and said second lens unit.

2. A zoom lens according to claim 1, wherein the paraxial lateral magnification $m_2$ obtained by the second lens unit is $m_2 = S'/S$, where S is the distance from the second lens unit to the point of focus of the first lens unit and S' is the distance from the second lens unit to the point of focus of the second lens unit.

3. The zoom lens according to claim 1, wherein said third lens unit is fixed and has the greatest lens diameter.

4. A zoom lens comprising, in order from an object, a first lens unit having positive refracting power, a second lens unit having negative refracting power, and a third lens unit having positive refracting power, said second lens unit having a paraxial lateral magnification $m_2$ greater than 1 at all times, said third lens unit being fixed in position, the arrangement being such that the distance X between the principal points of said first lens unit and said second lens unit and the distance Y between the principal points of said second lens unit and said third lens unit vary continuously so as to substantially satisfy the conditions given by:

$$X = f_1 - f_2(1/m_2 - 1)$$

and $$Y = f_2(1 - m_2) - f_3(1/m_3 - 1),$$

where $f_1$ is the focal length of the first lens unit, $f_2$ is the focal length of the second lens unit, $f_3$ is the focal length of the third lens unit, and $m_3$ is the paraxial lateral magnification of the third lens unit, and that the paraxial lateral magnification $m_2$ varies continuously, the zoom lens meeting the conditions, $$0.65 < f_1/F_W < 0.9$$

$$1.0 < |f_2|/f_1 < 1.5$$

$$0.85 < m_3 < 0.95$$

where $F_W$ is the focal length of the overall zoom lens at the wide-angle end, $f_1$, $f_2$ are the focal lengths of said first lens unit and said second lens unit, respectively, and $m_3$ is the paraxial lateral magnification of said third lens unit.

5. A zoom lens according to claim 1 or 4, wherein said first lens unit is divided at the largest gap therein into a front unit closer to the object and a rear unit closer to the image, said front unit comprising a negative lens and a positive lens, the Abbe number $\nu_+$ of the positive lens and the Abbe $\nu_-$ of the negative lens meeting the relationship:

$$|\nu_+ - \nu_-| < 10.$$

6. A zoom lens according to claim 5, wherein the second lens unit comprises a positive lens and a negative lens, said positive lens having its surface of larger curvature closer to the image and convex toward the image.

* * * * *